United States Patent
Yamamoto

(10) Patent No.: US 7,917,811 B2
(45) Date of Patent: Mar. 29, 2011

(54) VIRTUAL COMPUTER SYSTEM

(75) Inventor: Mitsuo Yamamoto, Ebina (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 12/105,518

(22) Filed: Apr. 18, 2008

(65) Prior Publication Data

US 2008/0263407 A1    Oct. 23, 2008

(30) Foreign Application Priority Data

Apr. 19, 2007   (JP) ................................. 2007-109988

(51) Int. Cl.
G06F 11/00 (2006.01)
(52) U.S. Cl. ........................................................ 714/44
(58) Field of Classification Search ...................... 714/31
See application file for complete search history.

(56) References Cited

U.S. PATENT DOCUMENTS

| | | | | |
|---|---|---|---|---|
| 6,584,585 B1 * | 6/2003 | Patterson, Jr. ................... | 714/44 |
| 7,496,790 B2 * | 2/2009 | Arndt et al. ..................... | 714/24 |
| 2003/0037089 A1 * | 2/2003 | Cota-Robles et al. ............ | 709/1 |
| 2007/0203943 A1 * | 8/2007 | Adlung et al. .............. | 707/104.1 |
| 2010/0037097 A1 * | 2/2010 | Kobayashi et al. ............. | 714/19 |

FOREIGN PATENT DOCUMENTS

| | | |
|---|---|---|
| JP | 4-257035 | 9/1992 |
| JP | 2000-222247 | 8/2000 |
| JP | 2002-323987 | 11/2002 |

* cited by examiner

Primary Examiner — Scott T Baderman
Assistant Examiner — Yair Leibovich
(74) Attorney, Agent, or Firm — Mattingly & Malur, P.C.

(57) ABSTRACT

To improve the maintainability of a virtual machine system, there is provided a mechanism capable of appropriately reporting a failure that occurs in a dedicated PCI device, in a shared PCI device, or in a virtual PCI device. A device for transferring PCI device configuration information between a failure monitoring application and a hypervisor that monitors a PCI device failure is prepared, and the failure monitoring application is operated in a user virtual machine and in a control virtual machine. Based on the above-described PCI device configuration information, the failure monitoring application operating in the user virtual machine monitors a dedicated PCI device failure and a virtual PCI device failure, and the failure monitoring application operating in the control virtual machine monitors a shared PCI device failure, respectively, thereby appropriately reporting a failure of the dedicated PCI device, the shared PCI device, or the virtual PCI device without duplication.

2 Claims, 6 Drawing Sheets

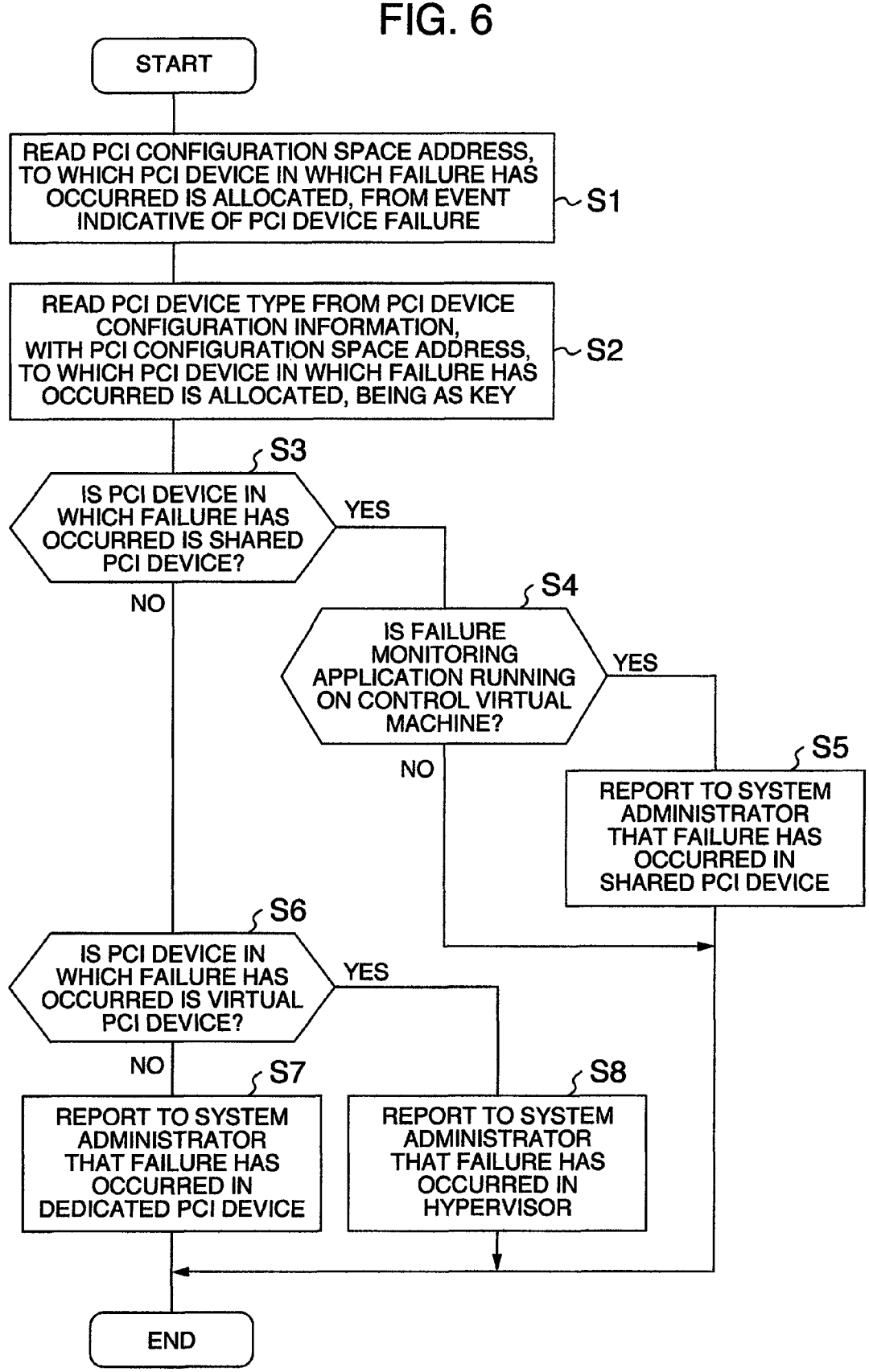

VIRTUAL COMPUTER SYSTEM

BACKGROUND OF THE INVENTION

The present invention relates to a method for monitoring a device failure of a computing system, and in particular, relates to a technique for monitoring a PCI device failure in a virtual machine system in which a plurality of virtual machines run on a real machine.

In order to improve the maintainability of the computing system, it is necessary to correctly notify a system administrator of an area where a failure has occurred. JP-A-2000-222247 describes a method for monitoring a failure, in which a failure monitoring application periodically monitors an event occurring on an operating system (OS) and issues a warning of occurrence of a fault when it has detected an event indicative of the occurrence of a fault.

SUMMARY OF THE INVENTION

However, the method for monitoring a failure, wherein in a virtual machine system, in which a plurality of virtual machines run on a real machine, the above-described method for monitoring an event is used on the respective virtual machines to periodically monitor an event generated by a device driver of an OS and to detect a PCI device failure, has the following problems.

Firstly, in monitoring a failure with respect to a shared PCI device (i.e., one real PCI device which a plurality of virtual machines use), when a failure has occurred in the real PCI device, a device driver of an OS operating on the respective virtual machines that use the shared PCI device generates an event of the failure, so that a failure monitoring application operating on the respective virtual machines detects the failure, which is consequently notified as a plurality of failures to a system administrator of the virtual machine system. Actually, the above-described failure needs to be reported as the failure of one real PCI device.

Secondly, in monitoring a failure with respect to a virtual PCI device which a hypervisor not having a real PCI device virtually creates, when a failure has occurred in the virtual PCI device due to an anomaly in processing the virtual PCI device by the hypervisor, a device driver of an OS operating on a virtual machine that is currently used in the virtual PCI device detects the failure by means of a failure monitoring application in order to generate an event of the failure, which is consequently notified as the occurrence of the PCI device failure to a system administrator of the virtual machine system. Actually, the above-described failure needs to be reported the an anomaly of the hypervisor.

In order to solve the above-described problems, the present invention is achieved as follows.

A virtual machine system, in which a plurality of virtual machines operate on a real machine under control of a virtual machine controller, comprises: an actual device used as a dedicated device only by one user virtual machine; and an actual device commonly used as a shared device by a plurality of user virtual machines via a control virtual machine, wherein each of the user virtual machines and the control virtual machine include a fault monitor that monitors a failure of a currently used actual device, wherein the virtual machine controller holds configuration information of a device that is allocated to each of the virtual machines corresponding to each of the virtual machines, and wherein each fault monitor notifies a system administrator of a device failure in accordance with the device configuration information corresponding to trouble information at the time of device failure detection.

BRIEF DESCRIPTION OF THE DRAWINGS

FIG. 6 is a flowchart illustrating a process that is performed when the failure monitoring application detects a PCI device failure.

DESCRIPTION OF THE EMBODIMENTS

Hereinafter, an embodiment in practicing the present invention is specifically described using the accompanying drawings.

Figure 1:
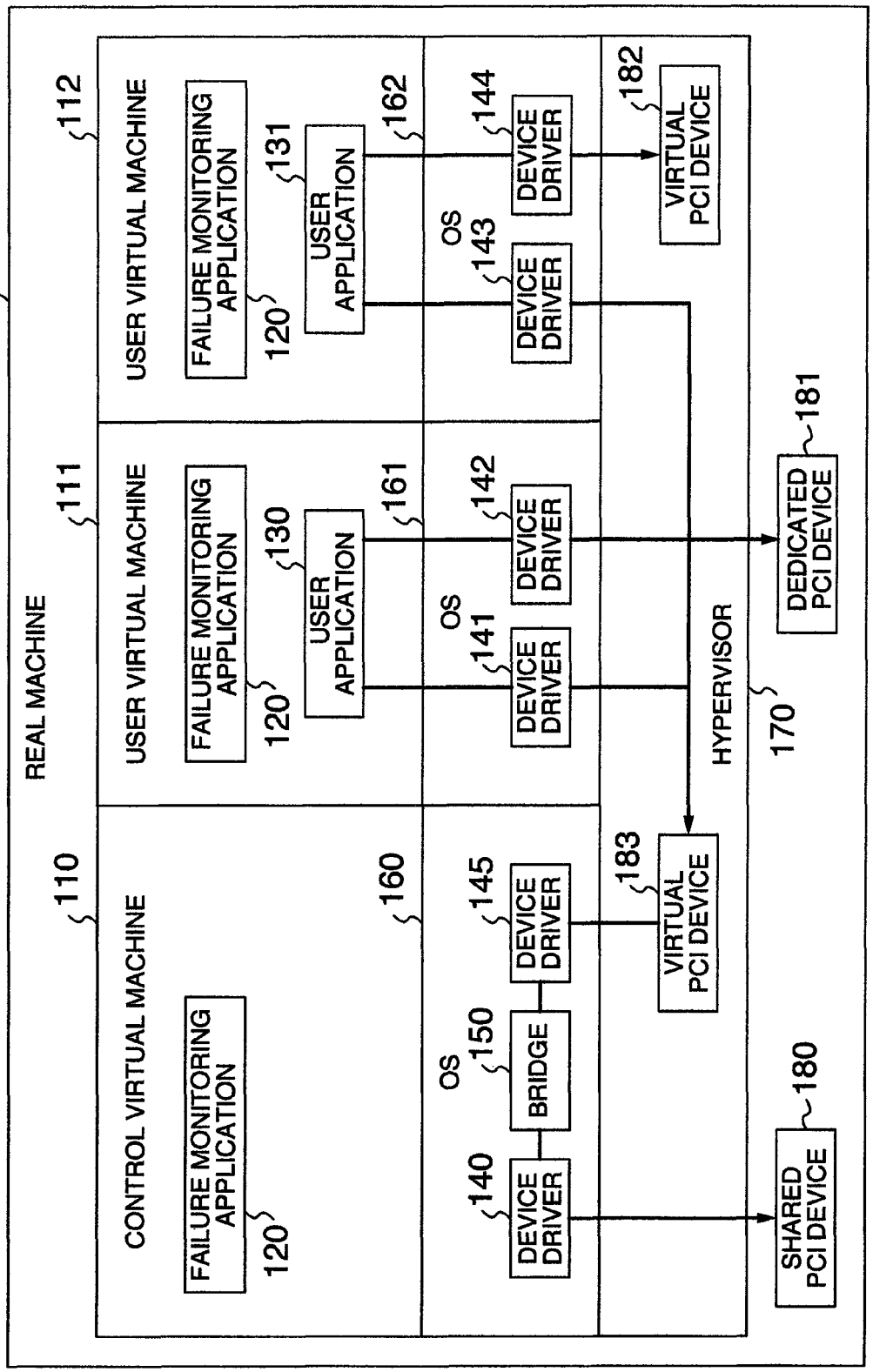
FIG. 1 is a view illustrating an example of a configuration for achieving a method for monitoring a PCI device failure in a virtual machine system of the present invention.

FIG. 1 is a system configuration view showing an embodiment of the present invention. On a real machine (100), a hypervisor (virtual machine control program) (170) runs to create virtual machines (110), (111), and (112). Among these, the virtual machine (110) is a control virtual machine that is used in order to control a virtual machine system, and the presence of this virtual machine is obscured with respect to a user of the virtual machine system.

The virtual machines (111) and (112) are user virtual machines which a user can use. OSs (160), (161), and (162) run on the respective virtual machines, and user applications (130) and (131) are running on the user virtual machines (111) and (112). The user applications (130) and (131) access PCI devices using device drivers (141), (142), (143), and (144).

A dedicated PCI device (181) is a real PCI device which only one user virtual machine can use. A virtual PCI device (182) is a PCI device not having a real PCI device, the PCI device being virtually created by a hypervisor (170). The hypervisor receives an access to a virtual PCI device that is performed from the user application (131) to the device driver (144) and then the virtual PCI device (182) of the hypervisor performs emulation with respect to the request and returns the result. The examples of the virtual PCI device (182) include a virtual NIC, which is prepared for the purpose of performing network communication among a plurality of virtual machines formed in a virtual machine system.

The shared PCI device (180) is a real PCI device which a plurality of user virtual machines can use. The hypervisor (170) receives an access request to the shared PCI device (180) that is performed from the user applications (130) and (131) running on the user virtual machines (111) and (112) to the device drivers (141) and (143), and the hypervisor (170) passes the request to the virtual PCI device (183) allocated to the control virtual machine (110). The virtual PCI device (183) and the shared PCI device (180) are interconnected via a bridge (150) which is a function of an OS (160), and a request to this virtual PCI device (183) is passed to the shared PCI device (180) via the bridge (150), and the shared PCI device (180) performs the processing with respect to the request and returns the result. On the respective virtual machines (110), (111), and (112), a failure monitoring application (120) is running to periodically monitor an event of the OS and detect a PCI device failure.

Note that, in the view, for simplification, the description is made assuming that one control virtual machine, two user virtual machines, one shared PCI device, one dedicated PCI device, and two virtual PCI devices are provided, but not limited to these numbers, and needless to say that in the present invention two or more control virtual machines, user virtual machines, shared PCI devices, dedicated PCI devices, and virtual PCI devices may be provided.

Figure 2:
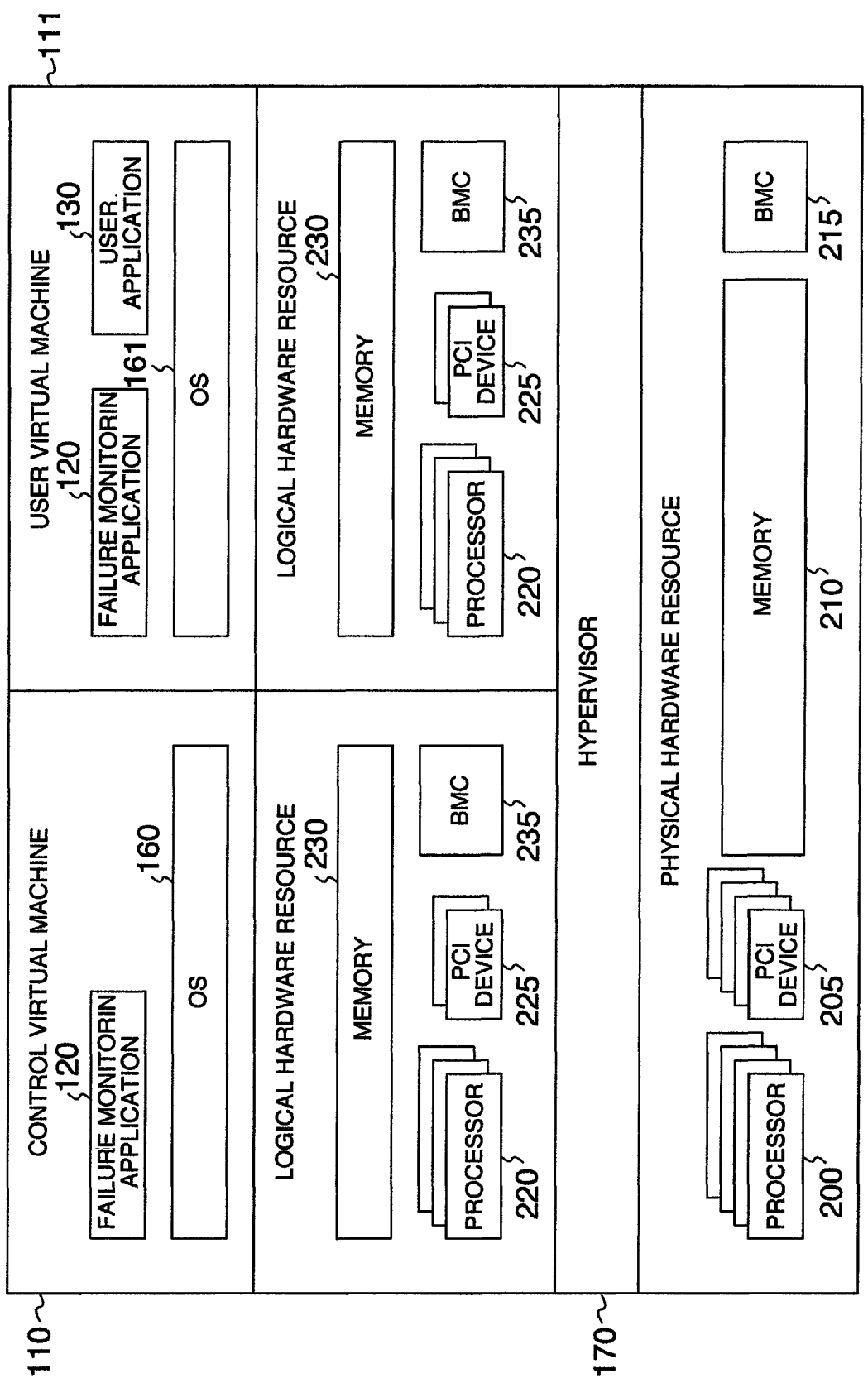
FIG. 2 is a view illustrating an example of a method for virtualizing hardware in the virtual computing system.

FIG. 2 is a view illustrating a method for virtualizing hardware in the virtual machine system. The hypervisor (170) creates a virtual machine comprising a logical processor (220), a logical PCI device (225), a logical memory (230), and a logical BMC (235) (Baseboard Management Controller) by time sharing a physical processor (200), a physical PCI device (205), a physical memory (210), and a physical BMC (215) by time slice or by dividing the physical hardware resources. As described above, this virtual machine includes the control virtual machine (110) and the user virtual machine (111) depending on their roles, wherein on the control virtual machine (110), the OS (160) and the failure monitoring application (120) operate utilizing the logical hardware resources which the hypervisor creates, while on the user virtual machine (111), the OS (161), the failure monitoring application (120), and the user application (130) operate utilizing the same.

Figure 3:
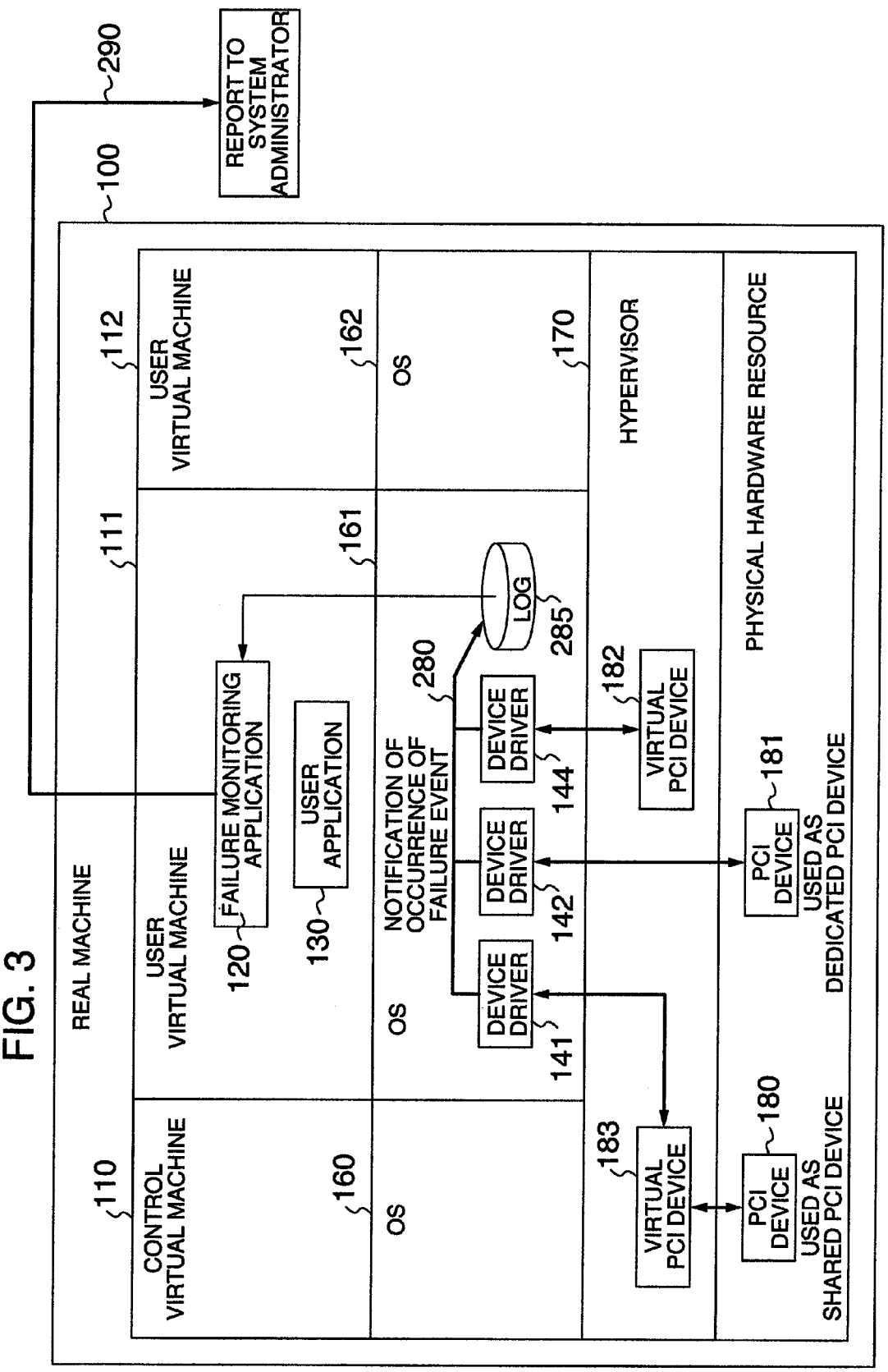
FIG. 3 is a view illustrating an example of an operation in which a failure monitoring application monitors an event which a device driver outputs.

FIG. 3 is a view illustrating processing in which the failure monitoring application monitors the event of a failure which a device driver outputs. When a failure occurs in a physical PCI device and if the physical PCI device is used as the dedicated PCI device (181), the device driver (142) of the OS operating on a virtual machine that uses the dedicated PCI device will detect an anomaly, prepare trouble information, and write this in a log (285) of the OS as a failure event (280). Moreover, when a physical PCI device is used as the shared PCI device (180), the device driver (141) of the OS operating on all the virtual machines that are using the shared PCI device will detect an anomaly, prepare trouble information, and write this in the log (285) of the OS as the failure event (280).

On the other hand, since the virtual PCI device (182) is virtually created by the hypervisor, if an anomaly occurs in the emulation process of the virtual PCI device of the hypervisor, the device driver (144) of an OS operating on a virtual machine that is using the virtual PCI device will detect the anomaly, prepare trouble information, and write this in the log (285) of the OS as a failure event. The failure monitoring application (120) periodically reads the log (285), on which an occurred event is recorded, monitors the failure event (280) which the device drivers (141), (142), and (144) output, and reports, when having detected an event indicative of a PCI device failure, the occurrence of the PCI device failure to a system administrator (290).

Figure 4:
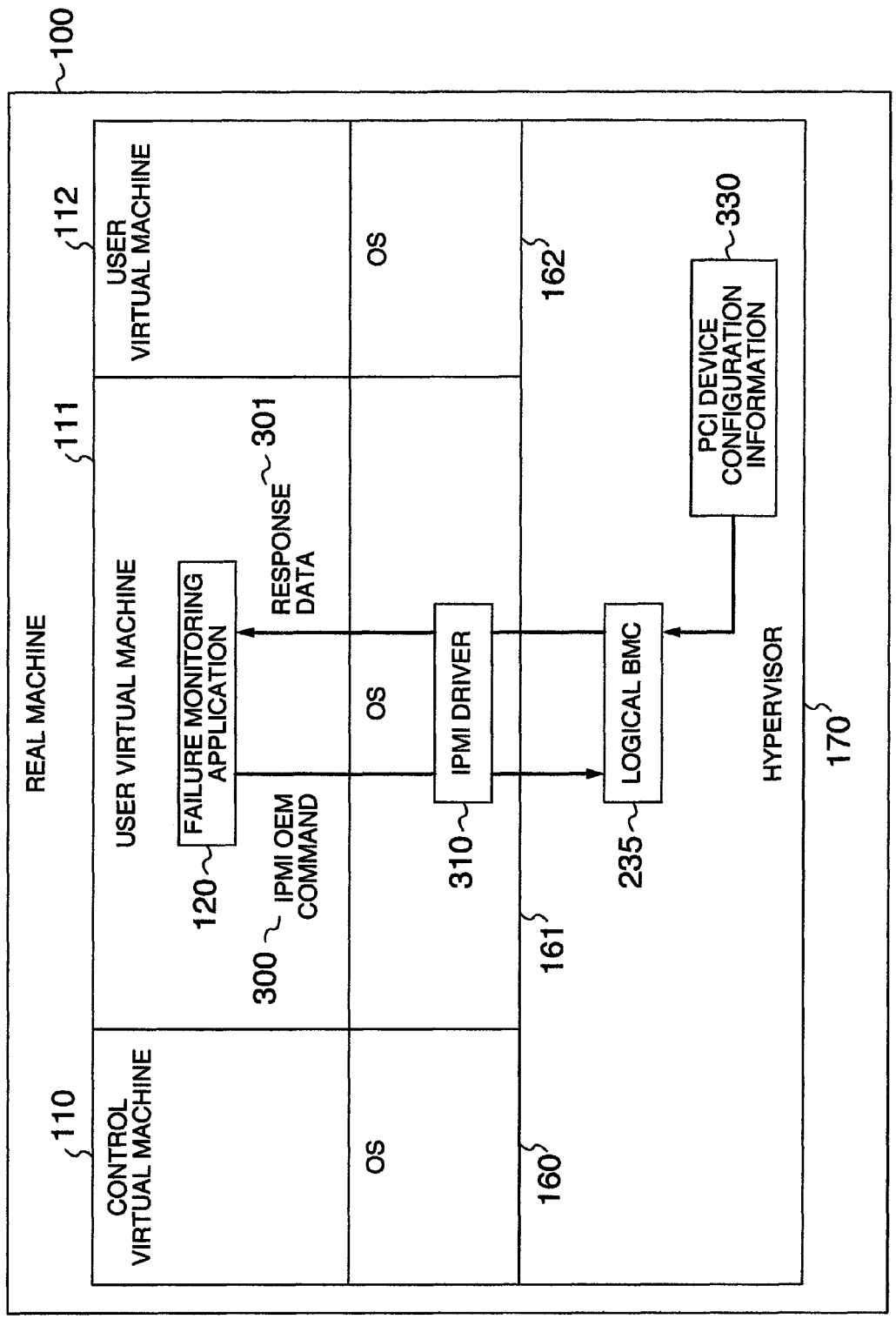
FIG. 4 is a view illustrating an example of an operation in which the failure monitoring application reads PCI device configuration information from a hypervisor.

FIG. 4 is a view illustrating a process, in which the failure monitoring application reads PCI device configuration information from the hypervisor. The PCI device configuration information is information indicative of the allocation of a PCI device to a virtual machine, and is held on a memory which the hypervisor manages and the hypervisor itself uses. This is present for each virtual machine.

The failure monitoring application (120) issues, on start-up or when it detects that the configuration of a PCI device which a virtual machine is currently using has been changed, an OEM IPMI command (300) to read PCI configuration information to an IPMI driver (310) of the OS (161). The IPMI stands for Intelligent Platform Management Interface which is a management interface of a computer, and the OEM IPMI command (300) to read PCI configuration information is newly added in the present invention. The logical BMC (235) receives the OEM IPMI command (300) which the failure monitoring application (120) issues. When the hypervisor (170) recognizes that the OEM IPMI command (300) to read PCI device configuration information has come to the logical BMC (235), it passes the PCI device configuration information (330) to the logical BMC (235), and this PCI device configuration information (330) will reach the failure monitoring application (120) as a response data (301) via the IPMI driver (310).

Figure 5:
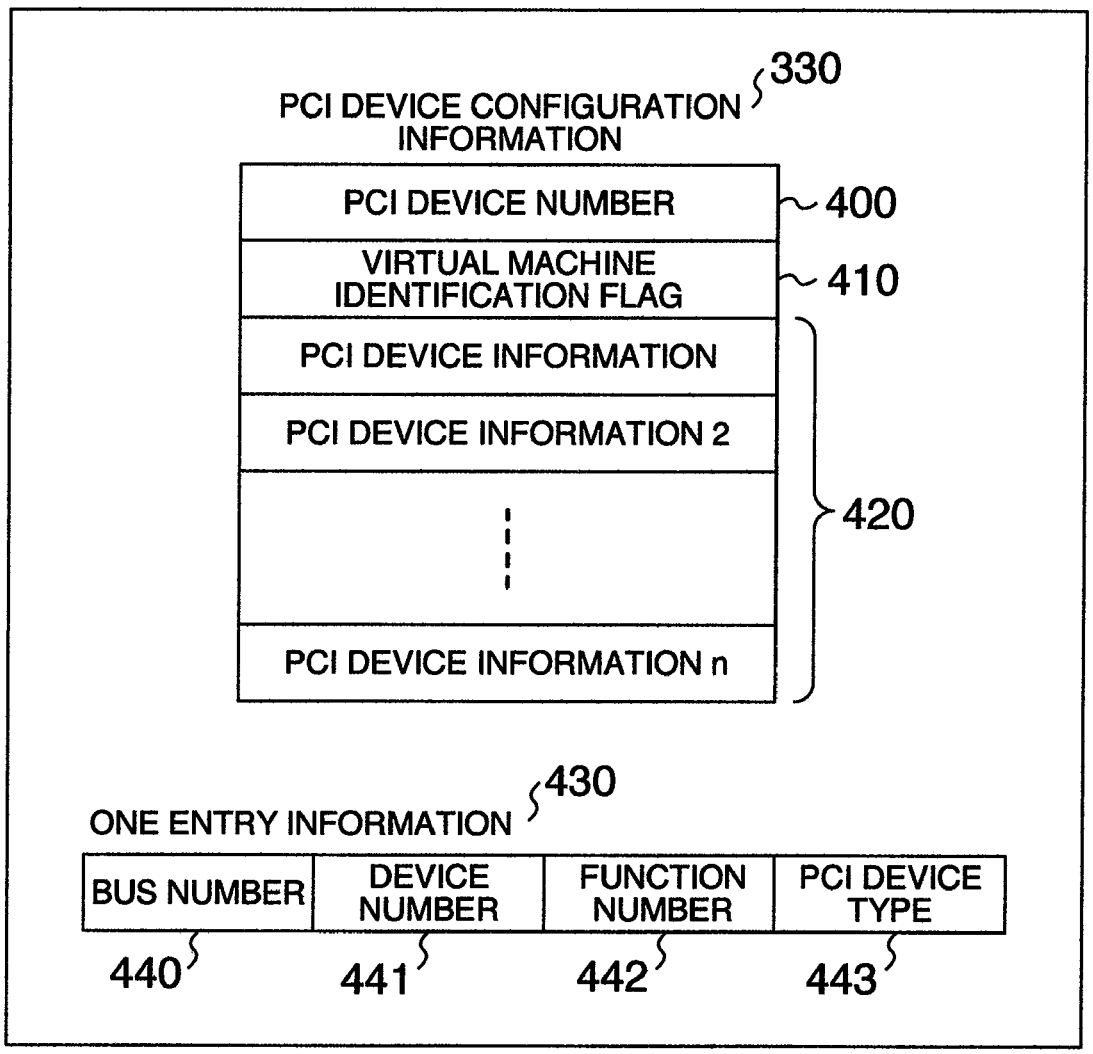
FIG. 5 is a view illustrating an example of the PCI device configuration information.

FIG. 5 is a view explaining the details of the PCI device configuration information (330). A PCI device number (400) indicates the number of PCI devices available in a virtual machine on which the failure monitoring application is running. In a virtual machine identification flag (410), information indicating whether the virtual machine on which the failure monitoring application is running is a user virtual machine or a control virtual machine is stored.

PCI device information (420) is information on each PCI device, and there are as many entries as the number indicated by the PCI device number (400). One entry information (430) describes the content of one entry of the PCI device information (420). This one entry expresses one PCI device, wherein a bus number (440), a device number (441), and a function number (442) mean a PCI configuration space address to which this PCI device is allocated, and wherein in a PCI device type (443), information indicating whether this PCI device is a dedicated PCI device, a shared PCI device, or a virtual PCI device is stored.

FIG. 6 is a flowchart when a failure monitoring application detects a PCI device failure. First, a PCI configuration space address (indicated by the bus number, device number, and function number), to which a PCI device in which the failure has occurred is allocated, is stored in an event indicative of a PCI device failure, and this address is read (S1).

Next, with the PCI configuration space address, to which a PCI device in which this failure has occurred is allocated, being as a key, the PCI device information (420) of the PCI device configuration information (330) is searched to find out an entry corresponding to the PCI device in which the failure has occurred, and to read the PCI device type (443) (S2).

Based on this PCI device type, it is determined whether or not the PCI device in which the failure has occurred is a shared PCI device (S3). If the PCI device in which the failure has occurred is the shared PCI device, the failure monitoring application reads the virtual machine identification flag (410) of the PCI device configuration information (330) to determine whether the failure monitoring application itself is running on the control virtual machine (S4). As a result of this determination, if the failure monitoring application is operating on the control virtual machine, the failure monitoring application reports to the system administrator that the failure has occurred in the shared PCI device (S5). Moreover, as a result of determination whether or not the failure monitoring application itself is running on the control virtual machine (S4), if the failure monitoring application is running on a user virtual machine, the fact that a failure has occurred will not be reported to the system administrator.

On the other hand, as a result of determination whether or not the PCI device in which the failure has occurred is the shared PCI device (S3), if the PCI device in which the failure has occurred is not the shared PCI device, it is determined whether or not the PCI device in which the failure has occurred is the virtual PCI device (S6). Then, if it is the virtual PCI device, the failure monitoring application reports to the system administrator that a failure has occurred in the hypervisor (S8). If it is neither the shared PCI device nor the virtual PCI device, i.e., if it is the dedicated PCI device, the failure monitoring application reports to the system administrator that a failure has occurred in the dedicated PCI device (S7).

As described above, according to this embodiment, a method can be provided, wherein in a virtual machine system, in which a plurality of virtual machines run on a real machine, a failure of a shared PCI device used by a plurality of virtual machines can be reported to a system administrator as one PCI device failure and furthermore a failure of a virtual PCI device not having an actual device, the virtual PCI device being created by a hypervisor, is reported as a failure of the hypervisor.

ADVANTAGES OF THE INVENTION

With the use of the PCI device failure monitoring technique of the present invention, in a virtual machine system, in which a plurality of virtual machines run on a real machine, it is possible to report a failure of a shared PCI device, i.e., a real PCI device which a plurality of virtual machines use, to a system administrator of the virtual machine system without duplication. Moreover, it is possible to appropriately report a failure of a virtual PCI device, which is virtually created by a hypervisor, to the system administrator of the virtual machine system not as a failure of a real PCI device but as a failure of the hypervisor. Thus, the present invention is effective in improving the maintainability of the virtual machine system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual machine system in which a plurality of virtual machines operate on a real machine comprising a physical processor, a physical memory, and an actual device under control of a virtual machine controller, the virtual machine system comprising:

a dedicated actual device operated only by one user virtual machine;

a shared actual device commonly operated by a plurality of user virtual machines allocated with said physical processor, physical memory, with the shared actual device being divided via a control virtual machine; and a virtual device not including the actual device, the virtual device being controlled by the virtual machine controller, wherein each of the user virtual machines and the control virtual machine include a fault monitor that monitors a device failure of the dedicated actual device and the shared actual device, wherein the virtual machine controller holds device configuration information of a device type that is allocated to each of the virtual machines, and wherein each of the fault monitors notifies a system administrator of a device failure in accordance with the device configuration information corresponding to trouble information at the time of device failure detection, wherein each of the fault monitors includes a means for reading device configuration information which the virtual machine controller holds, and reads the device configuration information on start-up or at a time of device configuration change, wherein the device configuration information contains an identification flag indicating whether a virtual machine currently operating is a user virtual machine or a control virtual machine, wherein the device type indicates whether a device allocated to a virtual machine is the dedicated actual device or the shared actual device, wherein the device type of the device configuration information contains information indicative of a virtual device, and wherein the fault monitor determines based on the information whether or not a device, in which a failure has occurred, is a virtual device, and when it is a failure of the virtual device, the fault monitor notifies this to a system administrator of the virtual machine system not as a failure of an actual device but as a failure of the virtual machine controller.

2. The virtual machine system according to claim 1, wherein at least one of the shared actual device and dedicated actual device is a physical PCI device, and the virtual device is a virtual PCI device.

* * * * *